(12) United States Patent
Mollmann et al.

(10) Patent No.: US 7,685,876 B2
(45) Date of Patent: Mar. 30, 2010

(54) METHODS AND SYSTEMS FOR BALANCING A ROTATABLE MEMBER

(75) Inventors: Daniel Edward Mollmann, Cincinnati, OH (US); Steven Alan Ross, Cincinnati, OH (US); Stephen Wade Faw, Liberty Township, OH (US); Enzo Luigi Morabito, West Chester, OH (US); Jeffrey Scott Allen, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 561 days.

(21) Appl. No.: 11/613,782

(22) Filed: Dec. 20, 2006

(65) Prior Publication Data

US 2008/0152498 A1 Jun. 26, 2008

(51) Int. Cl.
*G01M 1/38* (2006.01)
(52) U.S. Cl. .............................. 73/462; 73/468; 700/279
(58) Field of Classification Search .................. 73/462, 73/468, 460, 469–470; 700/279
See application file for complete search history.

(56) References Cited

U.S. PATENT DOCUMENTS

| 3,895,536 | A | | 7/1975 | Behm | |
|---|---|---|---|---|---|
| 3,916,495 | A | * | 11/1975 | Klassen et al. | 29/888.011 |
| 4,167,218 | A | | 9/1979 | Horiuchi et al. | |
| 4,543,825 | A | | 10/1985 | Schonfeld et al. | |
| 4,627,747 | A | | 12/1986 | Schonfeld et al. | |
| 5,214,585 | A | * | 5/1993 | Ehrich | 73/462 |
| 5,537,814 | A | * | 7/1996 | Nastuk et al. | 60/796 |
| 5,627,762 | A | * | 5/1997 | Cameron et al. | 700/279 |
| 5,871,314 | A | | 2/1999 | Trionfetti | |
| 6,341,419 | B1 | | 1/2002 | Forrester et al. | |

\* cited by examiner

*Primary Examiner*—Helen C. Kwok
(74) *Attorney, Agent, or Firm*—William Scott Andes, Esq.; Armstrong Teasdale LLP (57) ABSTRACT

Methods and systems of balancing a rotatable member are provided. A method includes separately balancing a first portion and a second portion of the rotatable member wherein the second portion mateable to said first portion, coupling the first and second portions to each other, measuring a physical dimension of the coupled first and second portions, and determining a balance weight magnitude and position based on the measured physical dimension.

20 Claims, 6 Drawing Sheets

METHODS AND SYSTEMS FOR BALANCING A ROTATABLE MEMBER

BACKGROUND OF THE INVENTION

This invention relates generally to methods and systems for balancing a rotatable member and, more particularly, to methods and systems of balancing a gas turbine engine rotor using a physical dimension to determine final balance.

At least some known rotatable members such as machine rotors include a monolithic rotor comprising only one piece. Other known rotors include separate portions that are assembled by coupling the portions together. Such rotors are generally balanced separately using a mock-up or dummy arbor that simulates each portion being assembled to its complementary portion. Any coupling eccentricity between the portion and the dummy arbor manifests itself as an unbalance of the assembly, resulting in vibration when the rotor is spinning. The unbalance due to the eccentricity is canceled during balancing of each of the portions. However, each portion may couple together differently during final assembly than it coupled to its respective dummy arbor during balancing, introducing an uncorrected eccentricity influence to the final assembly.

BRIEF DESCRIPTION OF THE INVENTION

In one embodiment, a method of balancing a rotatable member includes separately balancing a first portion and a second portion of the rotatable member wherein the second portion is mateable to the first portion, coupling the first and second portions to each other, measuring a physical dimension of the coupled first and second portions, and determining a balance weight magnitude and position based on the measured physical dimension.

In another embodiment, a computer system includes a software code segment programmed to facilitate minimizing imbalance in a rotor wherein the rotor including a first portion and a second portion coupled in tandem through a mating connection. The code segment is configured to control the computer system to receive a position and weight of each fastener in the mating connection, receive information pertaining to the eccentricity of the assembly with respect to the axis of rotation, and determine an imbalance of the rotor based on the received eccentricity information.

In still another embodiment, a method of balancing a tandem coupled rotor includes spin balancing at least one of a first portion and a second portion of the rotor, coupling the first and second portions to each other through a mating connection having a plurality of fasteners evenly spaced circumferentially about the mating connection, measuring an eccentricity of the coupled first and second portions, and determining a balance weight magnitude and position based on the measured eccentricity.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
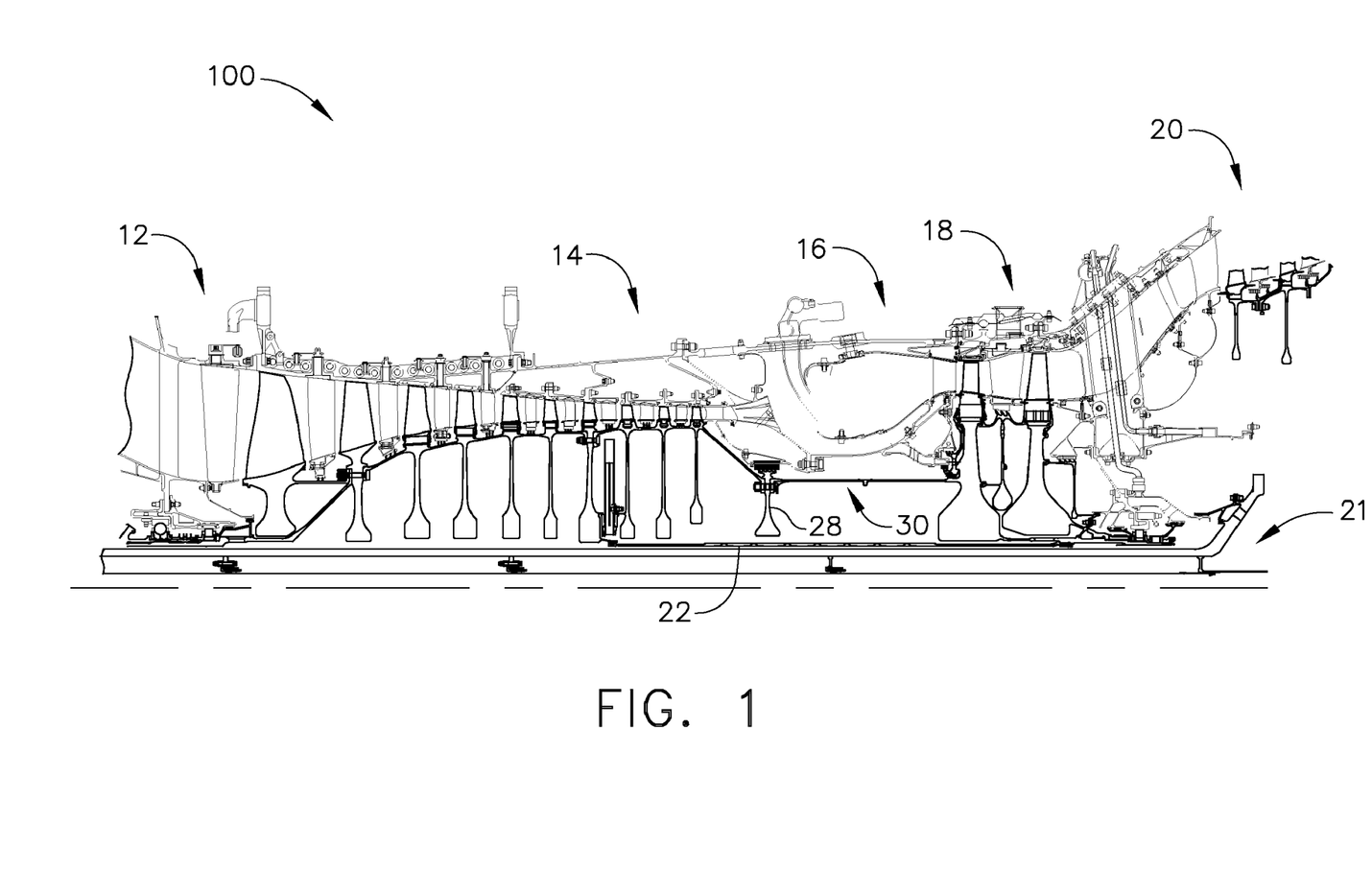
FIG. 1 is a longitudinal cross-sectional view of an exemplary gas turbine engine, including a high-pressure turbine (HPT) and high-pressure compressor (HPC)

FIG. 1 is a longitudinal cross-sectional view of an exemplary gas turbine engine 10 including a fan assembly 12, a high-pressure compressor 14, and a combustor 16. Engine 10 also includes a high-pressure turbine 18 and a low pressure turbine 20. Fan assembly 12 and low pressure turbine 20 are coupled by a first shaft 21, and high-pressure compressor 14 and high-pressure turbine 18 are coupled by a second shaft 22. In one embodiment, gas turbine engine 10 is a GEnx engine commercially available from General Electric Aircraft Engines, Cincinnati, Ohio. A CDP seal 28 is located proximate a coupling joint 30 between high-pressure compressor 14 and high-pressure turbine 18.

During operation, air flows through fan assembly 12 supplying compressed air to high-pressure compressor 14. The highly compressed air is delivered to combustor 16. Airflow from combustor 16 is channeled to drive turbines 18 and 20, prior to exiting gas turbine engine 10 through an exhaust nozzle 24 (not shown). More specifically, pressurized air from high-pressure compressor 14 is mixed with fuel in combustor 16 and ignited, thereby generating combustion gases. The combustion gases drive high-pressure turbine 18 which drives high-pressure compressor 14. The combustion gases are discharged from high-pressure turbine 18 into low pressure turbine 20. The core airflow is discharged from low pressure turbine 20 and directed afterward towards exhaust nozzle 24.

Figure 2:
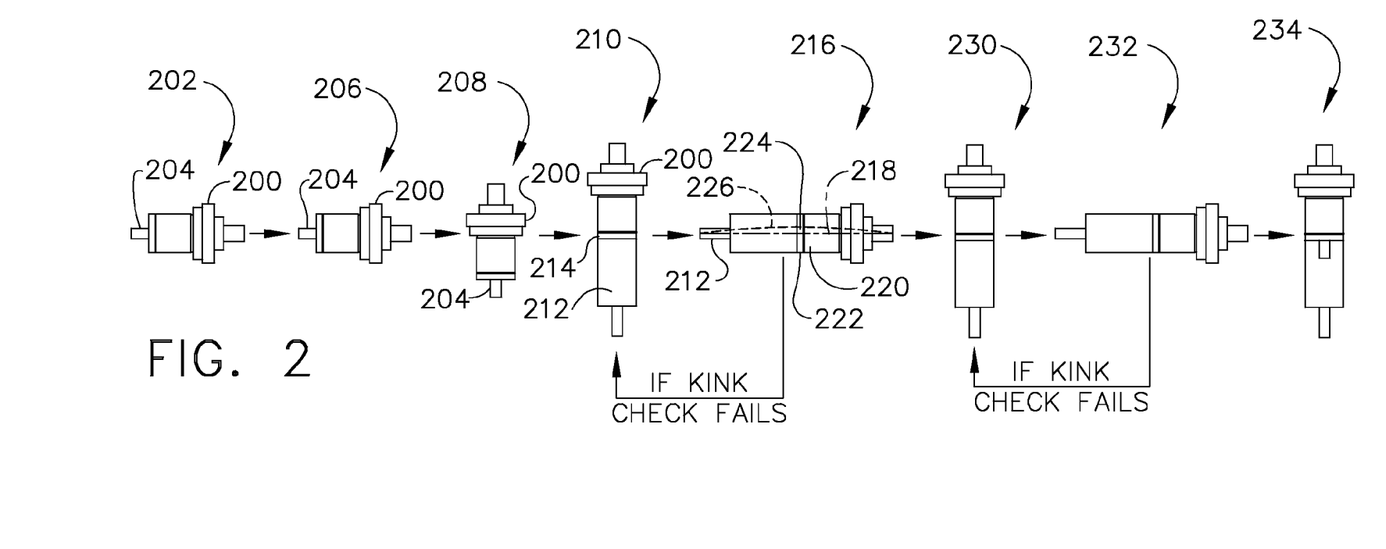
FIG. 2 is a flow diagram of a known method of balancing the high-pressure turbine rotor (HPTR) shown in FIG. 1.

FIG. 2 is a flow diagram of a known method of balancing a high-pressure turbine rotor (HPTR) 200. In the exemplary embodiment, balancing of HPTR 200 is done as part of a balancing procedure for balancing a high-pressure rotor comprising HPTR 200 and a high-pressure compressor rotor (not shown in FIG. 2). HPTR 200 and the high-pressure compressor rotor are mateable such that HPTR 200 drives high-pressure compressor rotor in a fully assembled gas turbine engine. In a first green balance step 202, a stub arbor 204 is mated to HPTR 200, HPTR 200 is rotated and monitored to determine a vibration of HPTR 200. Vibration is attempted to be reduced by swapping blades of HPTR 200. Additional vibration reduction is attempted by grinding 206 material from HPTR 200 at a determined location based on the phase and magnitude of the vibration.

At step 208, HPTR 200 is uncoupled from stub arbor 204 and a forward outboard seal is installed to HPTR 200. HPTR 200 is then mated 210 with a dummy high-pressure compressor rotor arbor 212 so that HPTR 200 can be spin balanced in a simulated assembled configuration. Dummy high-pressure compressor rotor arbor 212 is fabricated to simulate a high-pressure compressor rotor in dimensions, weight, and center of gravity. However, a mating surface 214 of dummy high-pressure compressor rotor arbor 212 may not be exactly the same as a mating surface of the high-pressure compressor rotor that HPTR 200 will eventually be assembled with. HPTR 200 and arbor 212 are spin balanced 216 and a runout of HPTR 200 with respect to the axis of rotation is measured. The runout is used to determine an amount of eccentricity of the HPTR 200 and arbor 212 combination. Eccentricity at the turbine rotor or compressor rotor flange is also referred to and is interchangeable with "kink." As used herein, kink is a measure of a radial distance 218 between the center of gravity of the coupled first and second portions at a coupling joint 222 and an intersection 224 of the axes of rotation 226 and 228 of arbor 212 and HPTR 200 at coupling joint 222. To ensure a good seating of the HPTR 200 to arbor 212 at coupling joint 222, HPTR 200 is disassembled from the arbor, then reassembled, and the kink remeasured. If the kink is different from the first measurement by more than a predetermined threshold, HPTR 200 and arbor 212 are decoupled and remated until a repeatable kink value is achieved. HPTR 200 and arbor 212 are then uncoupled 234.

Figure 3:
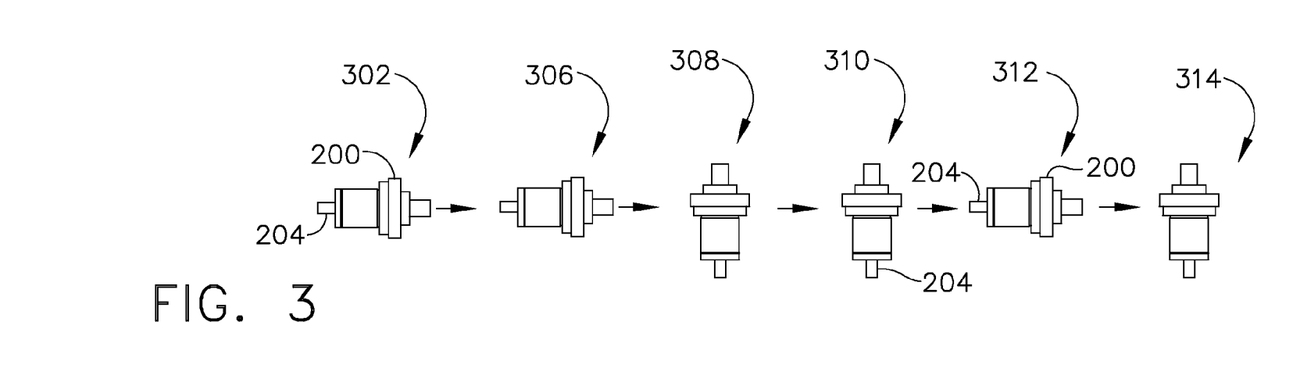
FIG. 3 is a flow diagram of a method of balancing the high-pressure turbine rotor (HPTR) in accordance with an exemplary embodiment of the present invention.

FIG. 3 is a flow diagram of a method of balancing high-pressure turbine rotor (HPTR) 200 in accordance with an exemplary embodiment of the present invention. In a first green balance step 302, stub arbor 204 is mated to HPTR 200, HPTR 200 is rotated and monitored to determine a vibration of HPTR 200. Vibration is attempted to be reduced by swapping blades of HPTR 200. Additional vibration reduction is attempted by grinding 306 material from HPTR 200 at a determined location based on the phase and magnitude of the vibration. At a step 308, HPTR 200 is uncoupled from stub arbor 204 and a forward outboard seal is installed to HPTR 200. HPTR 200 is then remated 310 to stub arbor 204 so that HPTR 200 can be spin balanced 312. HPTR 200 and stub arbor 204 are then split to await coupling to the high-pressure compressor rotor. Performing the method illustrated in FIG. 3 is estimated to yield time savings over performing the known method illustrated in FIG. 2.

Figure 4:
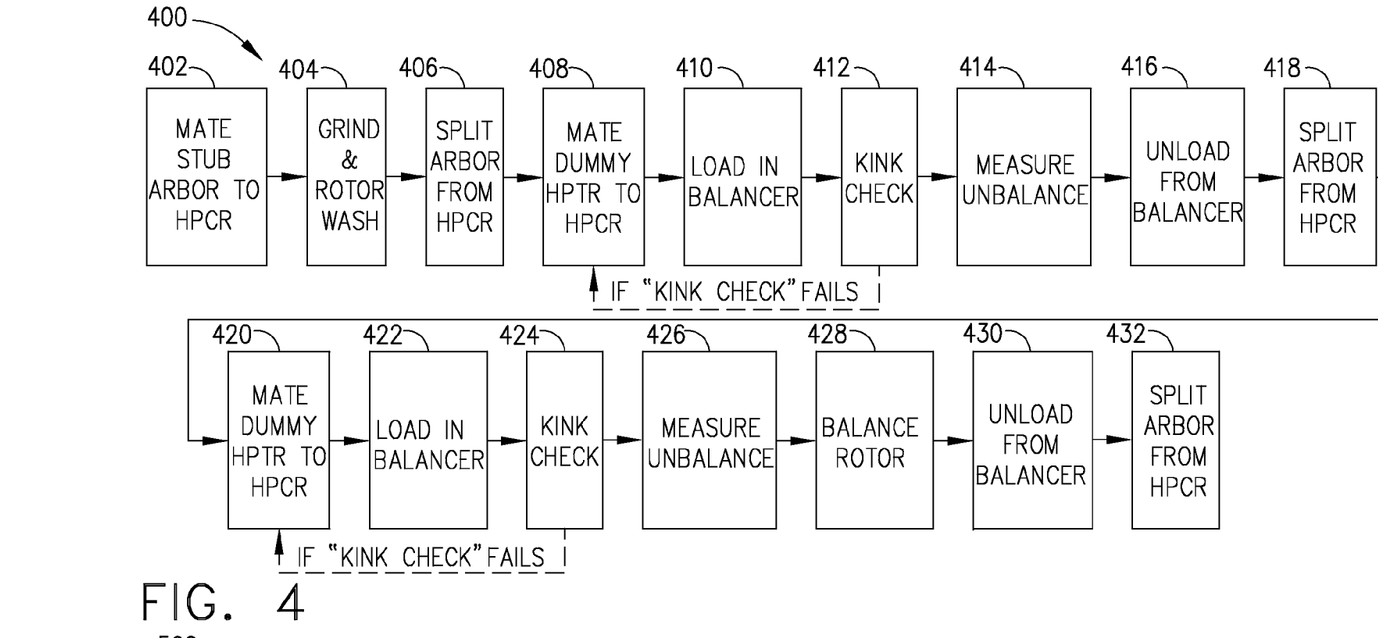
FIG. 4 is a flow diagram of a known method of balancing the high-pressure compressor rotor (HPCR) shown in FIG. 1.

FIG. 4 is a flow diagram of a known method 400 of balancing a high-pressure compressor rotor (HPCR). Method 400 includes mating 402 a stub arbor to the HPCR and balancing 404 the HPCR and performing a rotor wash on the HPCR. The arbor is uncoupled 406 from the HPCR and a dummy high-pressure turbine rotor is coupled 408 to the HPCR. The dummy high-pressure turbine rotor/HPCR combination is loaded 410 into a balancer and the kink of the rotor is measured 412 and the unbalance 414 is determined. The HPCR is then unloaded from the balancer 416, uncoupled from the dummy HPTR 418, and reassembled 420, and the kink remeasured 424. If the kink is different from the first measurement by more than a predetermined threshold, HPCR and arbor are decoupled and remated 420 until a repeatable kink value is achieved. When the kink check passes, the imbalance of the dummy high-pressure turbine rotor/HPCR combination is measured 426 using the balancer. The HPCR is then balanced 428, the dummy high-pressure turbine rotor/HPCR combination is unloaded 430 from the balancer, and the HPCR is uncoupled 432 from the dummy high-pressure turbine rotor.

Figure 5:
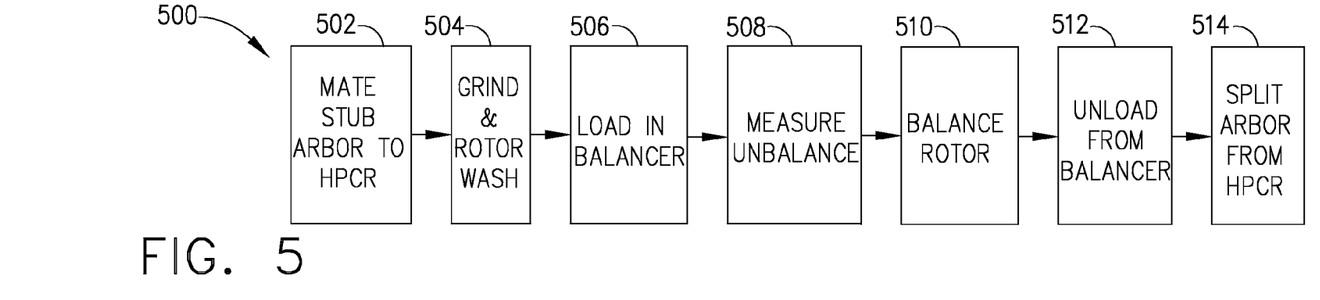
FIG. 5 is a flow diagram of a method of balancing the high-pressure compressor rotor (HPCR) in accordance with an exemplary embodiment of the present invention.

FIG. 5 is a flow diagram of a method 500 of balancing high-pressure compressor rotor (HPCR) in accordance with an exemplary embodiment of the present invention. Method 500 includes mating 502 a stub arbor to the HPCR and balancing 504 the HPCR and performing a rotor wash on the HPCR. The dummy high-pressure turbine rotor/HPCR combination is loaded 506 into the balancer. An imbalance is measured 508. The HPCR is then balanced 510, the dummy high-pressure turbine rotor/HPCR combination is unloaded 512 from the balancer, and the HPCR is uncoupled 514 from the stub arbor. Performing the method illustrated in FIG. 5 is estimated to yield time savings over performing the known method illustrated in FIG. 4.

Figure 6:
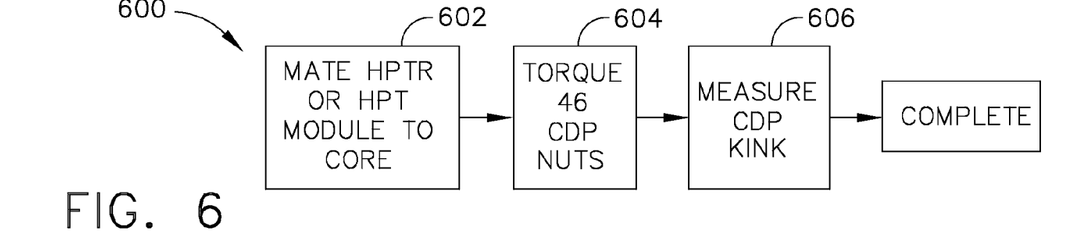
FIG. 6 is a flow diagram of a known method of vertically assembling a rotatable member including a high-pressure turbine rotor and a compressor rotor.

FIG. 6 is a flow diagram of a known method 600 of vertically assembling a rotatable member including a high-pressure turbine and a compressor rotor. Method 600 includes mating 602 the HPTR balanced in accordance with the method illustrated in FIG. 2 to the HPCR balanced in accordance with the method illustrated in FIG. 4. At 604, the fasteners at the CDP location are torqued. In the exemplary embodiment, the HPCR and HPTR flanges have forty-six nuts and bolts that are threadably couplable to secure the connection. The CDP kink is then measured 606. The kink may still exceed a predetermined threshold because the dummy turbine and dummy compressor flanges used to balance the HPTR and HPCR may have different flange seating characteristics than the HPTR and HPCR.

Figure 7:
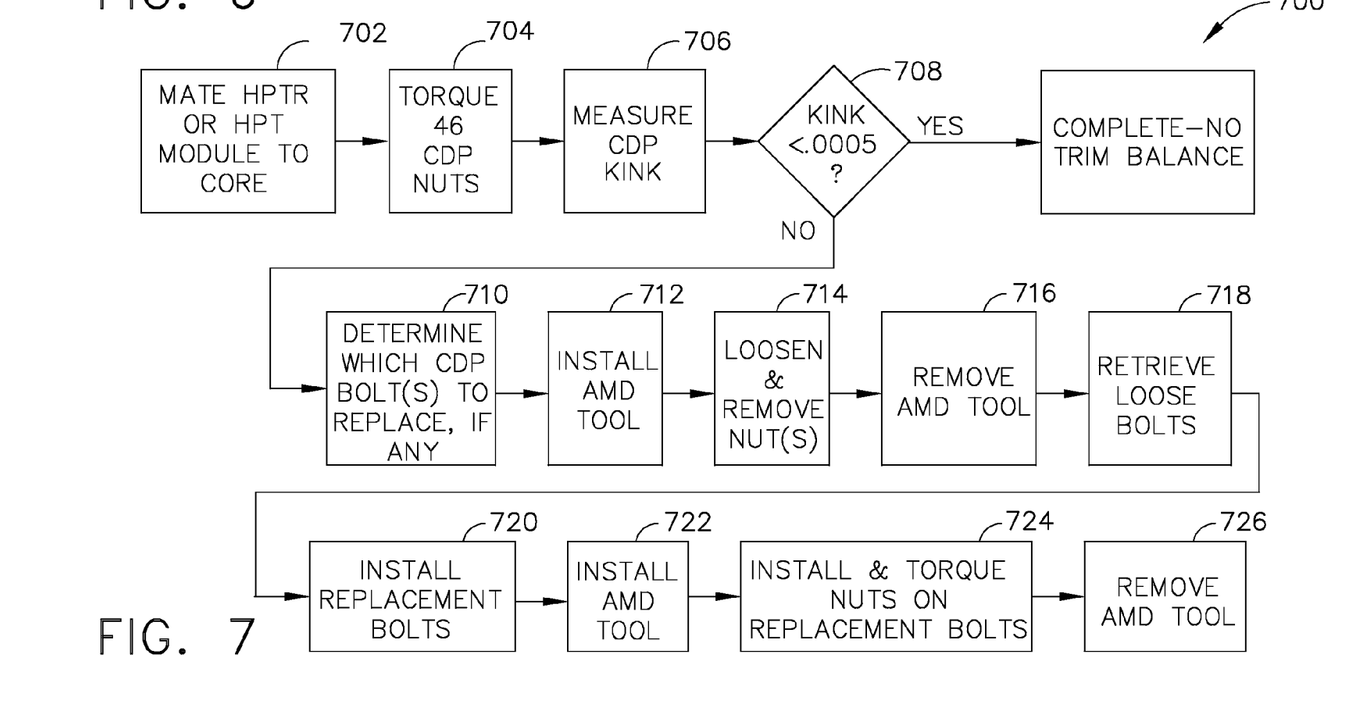
FIG. 7 is a flow diagram of a method of vertically assembling a rotatable member including a high-pressure turbine rotor and a compressor rotor in accordance with an exemplary embodiment of the present invention.

FIG. 7 is a flow diagram of a method 700 of vertically assembling a rotatable member including a high-pressure turbine and a compressor rotor in accordance with an exemplary embodiment of the present invention. Method 700 includes mating 702 the HPTR balanced in accordance with the method illustrated in FIG. 3 to the HPCR balanced in accordance with the method illustrated in FIG. 5. The flange joints used to mate the HPTR to the HPCR typically include a pair of annular radial flanges having a plurality of circumferentially spaced apart axial holes there through in which fastening bolts are disposed and secured by nuts to provide a connection for assembly or disassembly as required. The mating faces of the individual flange joints are subject to dimensional variation due to typical manufacturing tolerances. Accordingly, the faces typically contribute to relative eccentricity or kink between opposite ends of each of the rotor components, which is measured as runout at the CDP joint. At 704, the fasteners at the CDP location are torqued. In the exemplary embodiment, the HPCR and HPTR flanges have forty-six nuts and bolts that are threadably couplable to secure the connection. The CDP kink is then measured 706 and compared 708 to a predetermined threshold. In the exemplary embodiment, a kink threshold of approximately 0.0005 inches is used. It is estimated that a portion of assemblies will have a kink exceeding the threshold value necessitating further trim balancing to achieve an acceptable balance. In the remaining portion the vertical assembling process is complete if an acceptable kink measurement of less than the threshold value is received.

If the kink measurement exceeds the predetermined threshold, a balance weight placement and magnitude is determined 710 that substantially cancels the imbalance introduced by the amount of kink measured. In the exemplary embodiment, one or more coupling bolts at the CDP flange are determined to be replaced with coupling bolts having a different weight than the replaced bolts. The bolt position and amount of weight difference of each replacement bolt is determined 710 using a software tool and information relating to the dimensions and weight of the turbine and the compressor and the kink measurement values. A coupling bolt installation and torqueing tool is installed 712 and the nuts for the determined bolts to be replaced are loosened and removed 714. The installation and torqueing tool is removed 716 and the loose bolts are removed 718. Replacement bolts having a predetermined weight are installed 720 into the positions of the removed bolts, the installation and torqueing tool is installed 722, and the nuts are installed on the bolts and the nuts are torqued 724 onto the replacement bolts to predetermined torque amounts. The installation and torqueing tool is then removed and the vertical assembly and trim balancing is complete.

Figure 8:
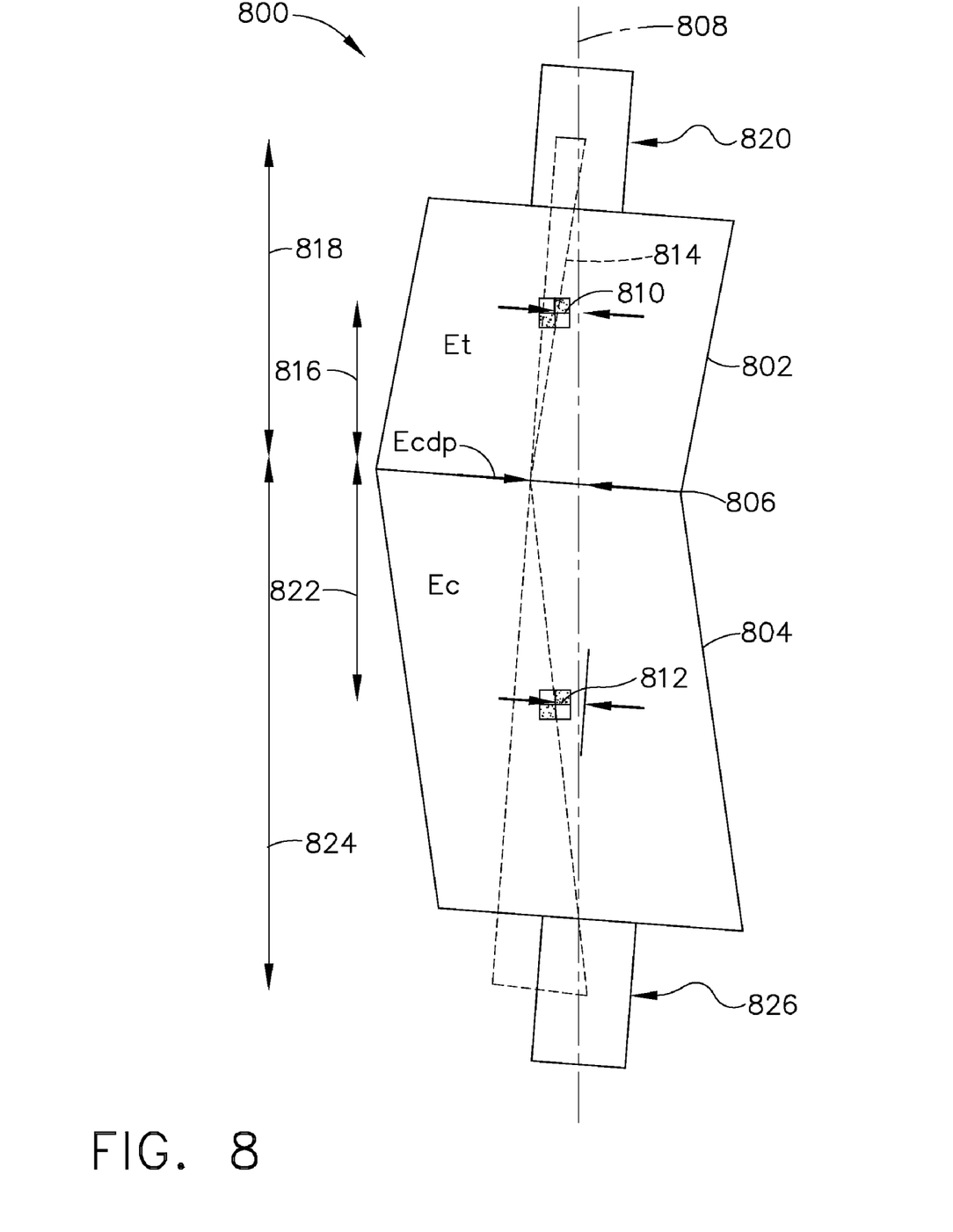
FIG. 8 is a schematic view of an exemplary rotatable member in accordance with an embodiment of the present invention.

FIG. 8 is a schematic view of an exemplary rotatable member 800 in accordance with an embodiment of the present invention. In the exemplary embodiment, a high-pressure turbine rotor (HPTR) 802 is coupled to a high-pressure compressor rotor (HPCR) 804 at a CDP joint 806. Rotatable member 800 includes an axis of rotation 808 about which rotatable member 800 rotates. Because HPTR 802 and HPCR 804 may not couple squarely at CDP joint 806, a center of gravity 810 of HPTR 802 and a center of gravity 812 of HPCR 804 may not lie on axis of rotation 808. Such eccentricity ($e_{CDP}$) is referred to as "kink" and is expressed as a distance $e_{CDP}$ between axis of rotation 808 and an intersection of the geometric centerline 814 of HPTR 802 and the geometric centerline of HPCR 804 at CDP joint 806. In the exemplary embodiment, $e_{CDP}$ is determined using runout of the assembled turbine and compressor in the area proximate to the CDP joint 806. Additionally, dimensional information relating to HPCR 804 and HPTR 802 is determined or is known from design drawings or other means. For example, a distance 816 represents the distance between CDP joint 806 and center of gravity 810 and a distance 818 represents the distance between CDP joint 806 and a bearing datum 820 of HPTR 802. A distance 822 represents the distance between CDP joint 806 and center of gravity 810 and a distance 824 represents the distance between CDP joint 806 and a bearing datum 826 of HPCR 804. The dimensional information, weight information, and runout data are entered into a software tool that determines one or more bolt location and bolt weight magnitudes that are necessary to be replaced to provide a force that will substantially cancel a vibration induced by the kink measured.

In an alternative embodiment, a weight of the CDP joint fasteners is determined to include a contribution not only from the assembly kink but, also from a modeshape of the assembled rotatable member. The magnitude of the balance weight my be adjusted down or up, if the CDP seal location is deflecting more or less than the rest of the rotor in the modeshape.

Figure 9:
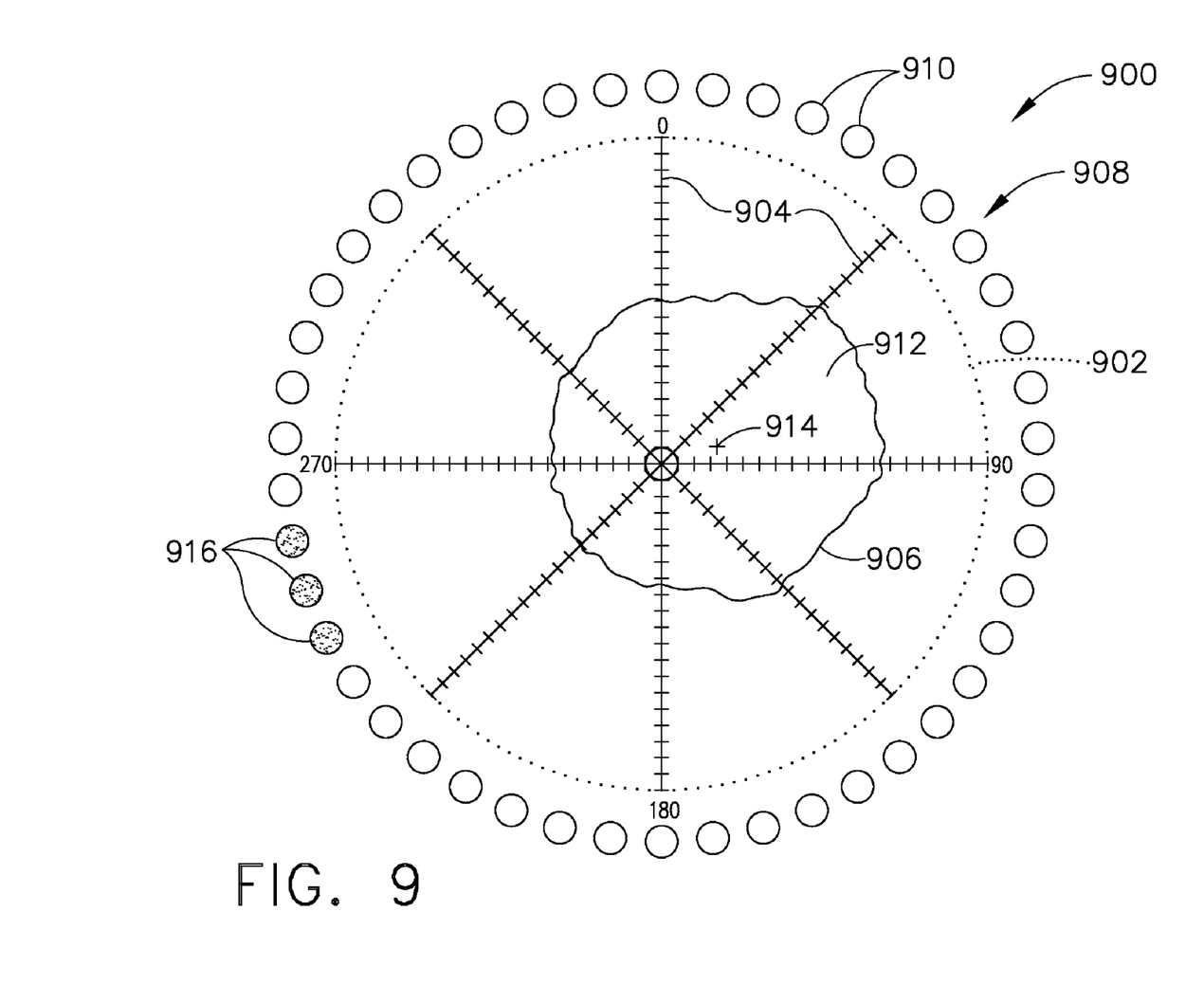
FIG. 9 is a polar diagram of an exemplary runout measurement result of a rotatable member that may be used with the gas turbine engine 10 shown in FIG. 1.

FIG. 9 is a polar diagram 900 of an exemplary runout measurement result of a rotatable member that may be used with gas turbine engine 10 (shown in FIG. 1). Polar diagram 900 includes an angular grid 902 graduated in units of degrees or radians, and distance axes 904 graduated in units of distance such as inches. Polar diagram 900 includes a trace 906 that represents runout measurement results from a vertical trim balance process in accordance with an embodiment of the present invention. Trace 906 includes a generally circular cross-section offset towards a bulging area 912 proximate approximately 70°. A cross-hair 914 also facilitates graphically illustrating a direction and magnitude of the kink of the centerline of rotatable member 800. Polar diagram 900 includes a row 908 of bolt positions circumscribing angular grid 902 wherein each bolt is represented by a circle 910 located in a position corresponding to a bolt position at the CDP position of rotatable member 900. In the exemplary embodiment, row 908 includes forty-six circles 910 representing forty-six bolts evenly spaced about the CDP position of rotatable member 900. Each circle may be numbered indicating a bolt torqueing pattern for use during assembly and to identify each bolt in the CDP position. To facilitate generating forces that will counter the forces generated due to kink in rotatable member 800, a software tool is used to determine which bolts should be removed and replaced with bolts having a different weight. In the exemplary embodiment, a solution includes three bolts 916 that are to be replaced to counter the forces that are generated in rotatable member due to the determined kink. Bolts 916 are replaced with bolts having a different weight than the replaced bolts.

The above-described methods and systems for balancing a rotatable member such as a gas turbine engine rotor are cost-effective and highly reliable. The methods include balancing mateable portions of the rotatable member separately, measuring the concentricity of the rotatable member proximate a coupling joint, and altering the weight of the rotatable member to compensate for the forces generated by a lack of concentricity in the rotatable member.

The method of balancing the rotor includes using measured rotor runout (eccentricity) data. As applied to the rotor, the HPC and HPT are balanced on short, 'stub' arbors. Because they are not balanced on the large dummy arbors, the unbalance due to the rotor kink is not corrected. After the HPC and HPT are mated together, the eccentricity or 'kink' of the final assembly is measured, and balance corrections are installed at the CDP seal to balance the assembly Such a rotor balance is an improvement over balancing with the large dummy arbors, because the balance is performed with the final assembly, rather than with the large dummy arbors prior to final assembly. Typically the seating or 'mate' of the HPC and HPT with each other is different than the mate with the large dummy arbors, resulting in a different balance condition of the rotor. Using the methods of the embodiments of the present invention the large arbors are not used nor needed resulting in a savings in tooling costs, with on-going savings by eliminating inspection, calibration, and storage of this tooling. In addition, the assembly process is less time consuming due to fewer total process steps and less time used per step. As a result the methods and systems described above provide for improved balance results, lower gas turbine engine vibration, lower tooling cost, lower assembly man hours, and faster assembly time.

While the invention has been described in terms of various specific embodiments, those skilled in the art will recognize that the invention can be practiced with modification within the spirit and scope of the claims.

What is claimed is:

1. A method of balancing a rotatable member comprising:
   separately balancing a first portion and a second portion of the rotatable member, said second portion mateable to said first portion;
   coupling the first and second portions to each other;
   measuring a physical dimension of the coupled first and second portions; and
   determining a balance weight magnitude and position based on at least one of the measured physical dimension and a modeshape of the rotatable member.

2. A method in accordance with claim 1 wherein separately balancing a first portion and a second portion comprises spin balancing at least one of the first portion and the second portion.

3. A method in accordance with claim 1 wherein measuring a physical dimension of the coupled first and second portions comprises measuring a runout of at least one of the first and second portions with respect to an axis of rotation of the rotatable member.

4. A method in accordance with claim 3 wherein determining a balance weight magnitude and position comprises determining a radial distance between the axis of rotation of the coupled first and second portions at a coupling joint and an intersection of an axis of rotation of each of the separate first and second portions at the coupling joint using the runout.

5. A method in accordance with claim 4 wherein determining a balance weight magnitude and position comprises:
  determining an imbalance force of the coupled first and second portions based on the radial distance; and
  determining a balance weight amount and placement position that substantially counters the imbalance force.

6. A method in accordance with claim 5 further comprising adding balance weight to the coupled first and second portions at the placement position substantially equal to the determined balance weight amount.

7. A method in accordance with claim 1 wherein coupling the first and second portions to each other further comprises coupling the first and second portions to each other via a plurality of fasteners, said method further comprising replacing at least one fastener of the plurality of fasteners with a fastener having a different weight.

8. A computer system comprising a software code segment programmed to facilitate minimizing imbalance in a rotor, said rotor comprising a first portion and a second portion coupled in tandem through a mating connection via at least one fastener, said code segment configured to:
  receive a position and a weight of each of the at least one fastener in the mating connection;
  receive information pertaining to an eccentricity of the assembly with respect to an axis of rotation; and
  determine an imbalance of the rotor based on at least one of the received eccentricity information and a modeshape of the rotor.

9. A computer system in accordance with claim 8 wherein said software code segment is configured to determine a position of replacement fasteners that are selected to facilitate reducing a vibration of the rotor based on the determined imbalance.

10. A computer system in accordance with claim 8 wherein said software code segment is configured to determine a correction weight placement angle and magnitude to counter vibration forces generated by the eccentricity of the rotor.

11. A computer system in accordance with claim 8 wherein said software code segment is configured to determine a correction weight placement at a fastener location on the mating connection.

12. A computer system in accordance with claim 8 wherein said software code segment is configured to determine a correction weight based on available predefined fastener weights.

13. A computer system in accordance with claim 8 wherein said software code segment is configured to receive eccentricity information as an angular measurement and a distance measurement.

14. A method of balancing a tandem coupled rotor assembly comprising:
  spin balancing at least one of a first portion and a second portion of the rotor;
  coupling the first and second portions to each other through a mating connection having a plurality of fasteners spaced circumferentially about the mating connection;
  measuring an eccentricity of the coupled first and second portions; and
  determining a balance weight magnitude and position based on at least one of the measured eccentricity and a modeshape of the rotor.

15. A method in accordance with claim 14 wherein measuring an eccentricity of the coupled first and second portions comprises measuring a runout of the assembly with respect to an axis of rotation of the assembly.

16. A method in accordance with claim 15 wherein determining a balance weight magnitude and position comprises determining a radial distance between the axis of rotation of the coupled first and second portions at a coupling joint and the center of gravity of the assembly using the runout.

17. A method in accordance with claim 16 wherein determining a balance weight magnitude and position comprises:
  determining an imbalance force of the coupled first and second portions based on the radial distance; and
  determining a balance weight amount and placement position that substantially counters the imbalance force.

18. A method in accordance with claim 17 further comprising adding balance weight to the coupled first and second portions at the placement position substantially equal to the determined balance weight amount.

19. A method in accordance with claim 14 further comprising replacing at least one fastener with a fastener having a different weight.

20. A method in accordance with claim 14 further comprising statically balancing the rotor using a measured dimension.

* * * * *